Dec. 17, 1968   J. C. H. DAVIS ET AL   3,416,358

FLUID SENSORS

Filed June 23, 1967

INVENTORS
JOHN CHRISTOPHER HAMMOND DAVIS
GUY EDWARD DAVIES

By Young & Thompson
ATTYS

United States Patent Office 3,416,358
Patented Dec. 17, 1968

3,416,358
FLUID SENSORS
John Christopher Hammond Davis and Guy Edward Davies, Taplow, England, assignors to British Telecommunications Research Limited, Taplow, England, a British company
Filed June 23, 1967, Ser. No. 648,424
Claims priority, application Great Britain, July 4, 1966, 30,016/66
10 Claims. (Cl. 73—37)

ABSTRACT OF THE DISCLOSURE

A fluid device for determining the angular position of a shaft comprises a cam structure mounted on the shaft and two fluid sensing heads disposed confronting opposite surfaces on the cam. The sensing heads have their outputs interconnected and either function as distance gauges or are arranged to have a varying area obstructed by the cam. The cam structure is so formed that the distances between the sensing heads and the respective surfaces of the cam are nominally equal so that possible errors due to wear of the shaft on which the cam is mounted for its bearings are compensated for.

---

The present invention relates to fluid sensors and is particularly concerned with the provision of arrangements whereby the output is maintained substantially unaltered in spite of wear in the device which results in changes in position relative to the sensing head.

Devices are already known which give an indication of distance in accordance with the output pressure obtained from a sensing head. Actually such devices operate by determining the resistance to fluid flow at the sensing head. Such a device may be used in determining the angular position of a shaft carrying a commutator, for instance for producing a digitising operation. For this to be effected, use is made of a special cam which follows the movement of the shaft and may be eccentrically mounted thereon or may have a particular shape. The chief object of the present invention is to ensure that consistent results are obtained from a device of this character even after wear has taken place which results in changes in the axial and/or radial position of the cam.

According to the invention, a fluidic device for determining the angular position of a shaft comprises a cam structure mounted on the shaft and two fluidic sensing heads disposed to confront surfaces on the cam structure with the axes of their sensing heads parallel to one another and having their outputs interconnected and their inputs connected to a common fluid pressure supply, the cam structure being so formed and the sensors being so disposed that the distances between the sensing heads and the respective surfaces of the cam structure are nominally equal to one another for all angular positions of the shaft. Thus changes in distance between the heads and the cam structure due to improper positioning as a result of wear are cancelled out and an invariable result is obtained.

Various possibilities arise at to the type of cam which will give the desired results and other things being equal, it will be desirable to employ a cam which can be simply produced and results in a straightforward and compact device.

A venturi tube may function as a fluidic sensing head, the output being taken from the waist of this tube. The following description assumes that such a device is used. It is not essential, however, that this type of head should be employed and the advantages of the present invention can be obtained by making use of other heads of known type.

Figure 1:
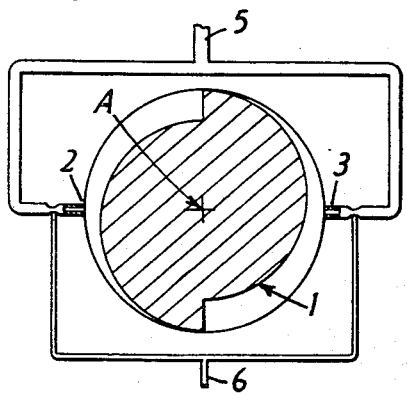
Figure 2:
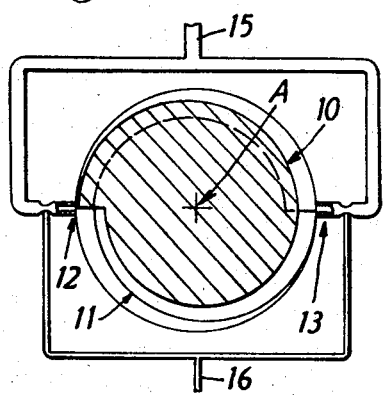
Figure 3:
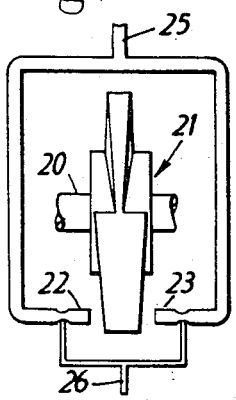
Figure 4:
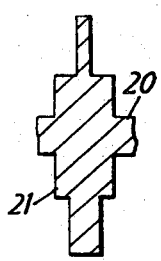
Figure 5:
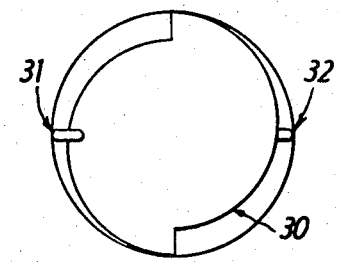
Figure 7:
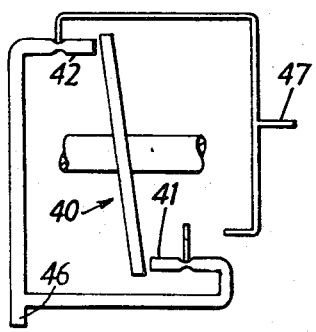
Figure 6:
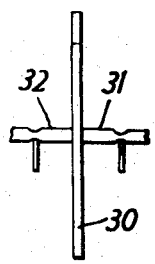
Figure 8:
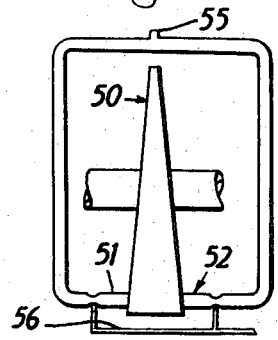

The invention will be more readily understood from the following detailed description with reference to the accompanying drawings, in which:

FIG. 1 is a schematic sectional view of one embodiment of the invention;
FIG. 2 is a schematic sectional view of another embodiment of the invention;
FIG. 3 is a schematic elevational view of a further embodiment of the invention;
FIG. 4 is a sectional view taken perpendicular to the direction of view of FIG. 3;
FIG. 5 is a schematic end elevational view of yet another embodiment of the invention;
FIG. 6 is a schematic side elevational view of the embodiment shown in FIG. 5;
FIG. 7 is a schematic elevational view of another embodiment of the invention; and
FIG. 8 is a schematic elevational view of a still further embodiment of the invention.

In the arrangement of FIG. 1, which is suitable for rotation of a shaft over an angle not exeeding 180°, use is made of a two-lobed cam 1 comprising two semicircular discs relatively displaced along their common diameter and mounted for rotation about their common axis of symmetry. Each of the sensing heads 2 and 3 which are located 180° apart operates on one half of the cam. A pressure supply is applied at 5 and the outputs from the two heads are combined to give an output signal at 6. As long as the cam is accurately located, the distances which the respective sensing heads measure will be the same but if wear takes place resulting in radial displacement, the distances will be different but their sum will be unaltered. Hence if pressure is proportional to distance, the output signal will remain the same for any particular angular position of the cam. This arrangement is obviously unaffected by axial movement of the shaft within the limits of the thickness of the cam.

In the arrangement of FIG. 2, which is suitable for rotation over the full 360°, two cams 10 and 11 of the same type are provided and are mounted side by side on the shaft for rotation about an axis A and are relatively displaced 180°. Separate sensing heads 12 and 13 are provided for the two cams 10 and 11 respectively. The pressure supply is applied at 15 and an output signal taken from 16. In this case also, radial displacement of the shaft is compensated and limited axial displacement produces no effect.

FIGS. 3 and 4 show an arrangement in which a cam is provided having an inner cylindrical portion or boss 20 and an outer portion 21 which increases in thickness circumferentially. The pressure supply to the sensing heads 22, 23 is applied at 25 and an output signal taken from 26. In this case the sensing heads 22 and 23 engage the cam on opposite sides in an axial direction and consequently axial displacement is compensated for. Radial displacement produces no effect, since on any radial line the thickness of the operative portion 21 of the cam is uniform.

A further modification is shown in FIGS. 5 and 6 which makes use of a cam 30 similar to that employed in the FIGURE 1 arrangement, but instead of the sensing heads 31 and 32 being applied radially as in FIGURE 1, they are located axially. They are preferably of non-circular section as shown but in any event are of sufficient width to cover the change in radius of the cam. As in the FIGURE 1 arrangement, the two sensing heads cooperate with the same cam but are located 180° apart and conveniently they are located on opposite sides of the cam as indicated in the side view. It will be realized that a similar arrangement of the sensors can be used with the cams shown in FIG. 2.

In a further modification shown in FIG. 7 the cam 40 is simpler to construct since it is in the form of a circular disc which is mounted slightly inclined to the axis of rotation. The sensing heads 41 and 42 operate on opposite sides of the disc and as before are located 180° apart. The pressure supply is applied at 45 and an output signal taken from 47. It will be appreciated that with this arrangement both axial and radial displacements of the shaft are balanced out.

FIG. 8 shows the use of a chamfered disc cam 50 which may be regarded as a double form of the FIG. 7 arrangement. This permits the sensing heads 51 and 52 to be located in the same angular position on opposite sides of the cam. The pressure supply is applied at 55 and an output signal is taken from 56. This arrangement, being symmetrical circcumferentially, will only cater for 180° movement of the shaft, since any particular output signal will correspond to two angular positions.

It will be appreciated that a number of modifications are possible, for instance a stepped cam may be used to provide a series of discrete levels of output signal which provide a digitising function.

The device according to the invention may be employed in a servo-control system where the angle of rotation of the shaft is proportional to the error from a datum, the output providing the control signal which returns the system to the datum position.

Another possible application is to provide an oscillatory pneumatic signal, for instance for test purposes. In this case the shaft will be driven at a speed to give the required frequency of signal and the waveform of the signal will then be determined by the cam shape.

The invention accordingly provides a simple modification of known fluid sensors whereby operation will continue unimpaired after appreciable wear has taken place or alternatively, greater bearing tolerances are acceptable initially.

We claim:

1. A fluidic device for determining the angular position of a shaft, comprising a cam structure mounted on the shaft and two fluidic sensing heads disposed confronting opposite surfaces on the cam structure with the axes of their sensing heads parallel to one another and having their outputs interconnected and their inputs connected to a common fluid pressure supply, the cam structure being so formed and the sensors so disposed that the distances between the sensing heads and the respective surfaces of the cam structure are nominally equal to one another for all angular positions of the shaft.

2. A device as claimed in claim 1, in which the sensing heads are equally spaced from the axis of rotation of the shaft.

3. A device as claimed in claim 2, in which the cam structure is formed in two identical cam sections, one of which is displaced by 180° with respect to other, the sensing heads being disposed opposite to each other and being arranged to confront a corresponding surface of a respective one of the sections.

4. A device as claimed in claim 3, in which the cam structure comprises two semi-circular discs mounted on the shaft with the two discs relatively displaced along their common diameter for rotation about their common axis of symmetry.

5. A device as claimed in claim 3, in which the two identical cam sections are mounted co-axially.

6. A device as claimed in claim 2, in which the cam structure comprises a disc mounted with its axis of symmetry inclined to its axis of rotation.

7. A device as claimed in claim 4, in which the sensing heads are arranged so that the fluid flow therefrom is directed parallel to the axis of the cam structure.

8. A device as claimed in claim 4, in which the sensing heads are arranged so that the fluid flow therefrom is radially inwardly directed.

9. A device as claimed in claim 1, in which the cam structure has a plane of symmetry perpendicular to its axis of rotation and the thickness of a radially outer portion thereof varies circumferentially, the sensing heads being disposed confronting each other on opposite sides of such outer portion.

10. A device as claimed in claim 9, in which the cam structure comprises a chamfered discc.

References Cited

UNITED STATES PATENTS

| 3,271,086 | 9/1966 | Deffrene | 308—9 |
| 3,276,676 | 10/1966 | Buske | 308—9 |
| 3,380,788 | 4/1968 | Wilcock | 308—9 |

FOREIGN PATENTS 504,335   4/1939   Great Britain.

S. CLEMENT SWISHER, *Primary Examiner.*

W. A. HENRY II, *Assistant Examiner.*